United States Patent [19]

Carimali et al.

[11] Patent Number: 5,284,015
[45] Date of Patent: Feb. 8, 1994

[54] TURBOJET ENGINE THRUST REVERSER WITH DIRECTIONAL CONTROL

[75] Inventors: Félix Carimali; Michel J. L. Legras, both of Le Havre, France

[73] Assignee: Societe Hispano-Suiza, Cedex, France

[21] Appl. No.: 942,218

[22] Filed: Sep. 9, 1992

[30] Foreign Application Priority Data

Sep. 11, 1991 [FR] France .................. 91 11192

[51] Int. Cl.⁵ .................................. F02K 3/02
[52] U.S. Cl. .......................... 60/226.2; 60/230; 239/265.29
[58] Field of Search .................. 60/230, 226.2; 239/265.19, 265.25, 265.29, 265.33; 244/110 B

[56] References Cited

U.S. PATENT DOCUMENTS

| | | |
|---|---|---|
| 2,968,150 | 1/1961 | Goebel . |
| 3,097,484 | 7/1963 | Andre et al. . |
| 3,475,913 | 11/1969 | Mortlock et al. . |
| 3,483,702 | 12/1969 | Ward . |
| 3,640,468 | 2/1972 | Searle et al. . |
| 3,893,626 | 7/1975 | Leibach et al. ......... 239/265.19 |
| 4,129,269 | 12/1978 | Fage . |
| 4,410,152 | 10/1983 | Kennedy et al. . |
| 4,485,970 | 12/1984 | Fournier et al. . |
| 4,916,895 | 4/1990 | Dubois . |

FOREIGN PATENT DOCUMENTS

| | | |
|---|---|---|
| 1286178 | 1/1962 | France . |
| 1403761 | 5/1965 | France . |
| 2559838 | 8/1985 | France . |
| 1022709 | 8/1965 | United Kingdom . |

Primary Examiner—Richard A. Bertsch
Assistant Examiner—W. J. Wicker
Attorney, Agent, or Firm—Bacon & Thomas

[57] ABSTRACT

A thrust reverser for a turbojet engine is disclosed having a movable component, such as a thrust reverser door, operatively associated with an engine housing, and vanes formed on the upstream edge portion of the movable component and extending inwardly from an interior surface. The vanes, which extend in a direction generally parallel to a longitudinal axis of the engine, are located in an array which extends across the upstream edge portion of the movable component from one side to the other. The vanes each may be generally triangular in configuration and have one side attached to the inner surface of the movable component and another side attached to a gas flow deflector extending laterally across the front edge of the movable component.

3 Claims, 4 Drawing Sheets

TURBOJET ENGINE THRUST REVERSER WITH DIRECTIONAL CONTROL

BACKGROUND OF THE INVENTION

The present invention relates to a thrust reverser for a turbojet engine, more particularly such a thrust reverser having vanes to control the direction of the gases emanating from the thrust reverser.

Turbojet engines are well-known in the art and may comprise a turbojet engine drivingly connected to a turbofan, usually mounted on the front of the turbojet engine. A turbofan housing, radically displaced from, but generally concentric with the turbojet engine housing, defines a cold flow air duct for air driven by the turbofan. In turbofan engines having a relatively high bypass ratio, thrust reversers are typically provided on the turbofan housing so as to redirect the air passing through the cold flow air duct during landing of the aircraft in order to provide a reverse thrust.

The housing for the turbojet engine has a hot gas flow duct for the hot gases emanating from the turbines of the turbojet engine. Thrust reversers may be associated with the hot gas flow duct to redirect the hot gas flow to provide a thrust reversing effect.

Thrust reversers may assume many different configurations, but a typical thrust reverser is illustrated in FIG. 1. The thrust reverser comprises a stationary, upstream portion 1 which forms a part of the engine housing, a movable portion 2 which may redirect the air or the hot gas flow and a stationary, downstream collar 3 which also forms a portion of the engine housing. The stationary upstream portion 1 typically comprises an exterior panel 4 which defines a portion of the exterior surface of the housing, an internal panel 5 which defines a boundary of the gas flow duct and a frame 6 which interconnects panels 4 and 5. The frame 6 also provides support for the actuator 7a which controls the movement of the movable portion 2 which, in this instance, comprises one or more movable thrust reversing doors 7. The number of such doors may vary depending upon the application of the engine to a particular type aircraft and typically may comprise 2, 3 or 4 such doors. The doors may be located around the circumference of the engine housing and, when in their deployed or thrust reversing positions, redirect the gas passing through the gas flow duct to provide a thrust reversing force. When in the closed, or forward thrust position, as illustrated in FIG. 1, the exterior panel 9 of the thrust reversing door 7 is flush with the outer surface of exterior panel 4 and the exterior surface of downstream collar 3 so as to provide a smooth aerodynamic surface for the air passing over the exterior of the housing, illustrated by arrow 10.

FIG. 2 illustrates an engine housing with a plurality of known thrust reversing doors 7 in their closed or forward thrust positions. When deployed to their open or reverse thrust positions, the forward, or upstream, edges are displaced radially outwardly from the generally annular engine housing. As is well-known in the art, rear, or downstream, portions of the thrust reverser doors 7 extend inwardly into the gas flow duct so as to redirect at least a portion of the gas outwardly through the opening in the engine housing in a forward direction. Each thrust reverser door 7 is operatively associated with a hydraulic jack or actuator 7a, which typically comprises a cylinder having an extendable and retractable piston rod attached to the thrust reverser door 7.

The terms "upstream" and "downstream" are defined in relation to the direction of air or gas circulation in the forward thrust mode, e.g., from the front of the engine towards the rear of the engine (left to right in FIG. 1). The air or gas passing through the gas flow duct, illustrated at 15 in FIG. 1, passes over the surface of internal panel 5 and over a deflector 8. Each thrust reverser door 7 has an interior door panel 11 which is connected to the exterior door panel 9 via brace 12 and a door gas deflector 13. Door gas deflector 13 extends radially inwardly past the surface of interior door panel 11 such that, when the thrust reverser door 7 is in its thrust reversing position, door gas deflector 13 will impart a more forward direction to the gases passing through the opening in the engine housing. When in its closed, forward thrust position, the thrust reverser door 7 forms part of the boundaries of cavity 16, which is bounded by the interior door panel 11, the deflector 8, the door air deflector 13 and line 14, which represents the ideal, theoretical surface interconnecting the internal panel 5 with the interior portion of the downstream collar portion 3. Cavity 16, as is well-known in the art, creates air flow distortion and perturbations within the gas flow duct thereby increasing aerodynamic losses and degrading engine performance in the forward thrust operating mode.

Typical pivoting door thrust reversing systems for a turbojet engine are described in U.S. Pat. Nos. 4,410,152 and 4,485,970, as well as French Patent 2,559,838. Solutions for improving the air flow through the cold flow air duct in the forward thrust operating mode are also known in the art, a typical example of which may be found in U.S. Pat. No. 4,916,895. This patent describes a thrust reverser door having a movable internal door panel segment which is movable such that it matches the ideal flow surface when the door is in the forward thrust position.

Another problem encountered by known turbojet engine thrust reversers is the controlling of the direction of the gases passing through the opening in the engine housing. This is of particular importance where the turbojet engine is mounted close to the aircraft structure where it would prove detrimental to have the thrust reversing gases contact the adjacent aircraft structure. Such control is also important to prevent the reingestion of the thrust reversing gases by the engine. The thrust reverser in French Patent 2,559,838 provides one attempt at a solution to controlling the shape and direction of the thrust reversing gases by providing a particular orientation to the upstream edge of the thrust reverser opening and/or the shaping of the distal edge of door gas deflector. The technique for controlling the lateral and forward deflections of the thrust reversing gases is defined as "fluid-sheet control".

Other problems have been encountered, especially in instances wherein the turbojet engine is attached to the aircraft such that it extends close to the ground surface. In this instance, as illustrated in FIG. 3 wherein the turbojet engine has four thrust reverser doors, the gases from the lower thrust reversers contact the ground surface at the large angle of incidence. As illustrated in FIG. 3, the turbojet engine 17 is attached beneath aircraft wing 18. When the thrust reverser doors are in their open, reverser thrust positions, they direct gases in flows 15a, 15b, 15c and 15d, respectively. As can be seen, the reverse thrust gas flows 15c and 15d impinge on the ground surface S at a substantially large angle of incidence i.

SUMMARY OF THE INVENTION

A thrust reverser for a turbojet engine is disclosed having a movable component, such as a thrust reverser door, operatively associated with an engine housing, and vanes formed on the upstream edge portion of the movable component and extending inwardly from an interior surface. The vanes, which extend in a direction generally parallel to a longitudinal axis of the engine, are located in an array which extends across the upstream edge portion of the movable component from one side to the other. The vanes each may be generally triangular in configuration and have one side attached to the inner surface of the movable component and another side attached to a gas flow deflector extending laterally across the front edge of the movable component.

The movable component may be operatively associated with a turbofan housing in a turbofan-type turbojet engine, or it may be associated with a hot gas flow duct of a turbojet engine. In either case, the vanes will direct the gases acted on by the movable component in a desired direction to minimize impingement with the ground surface, or with an adjacent aircraft structure.

DETAILED DESCRIPTION OF THE PREFERRED EMBODIMENTS

Figure 1:
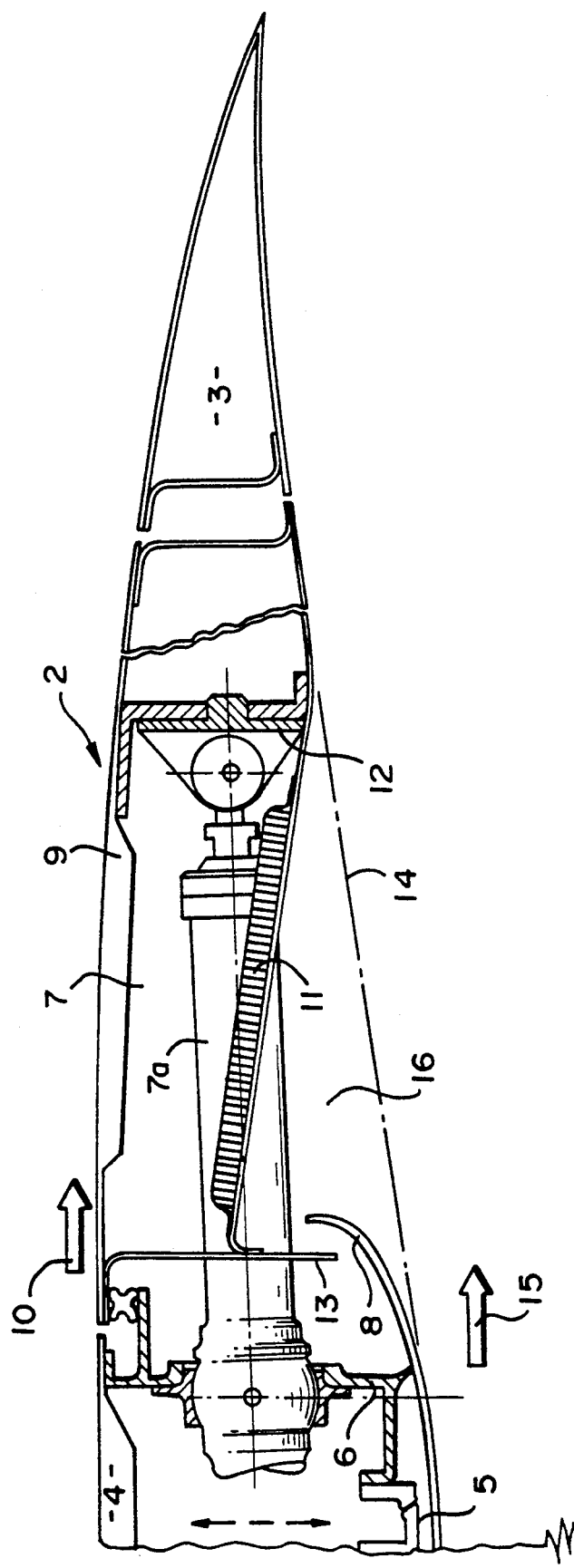
FIG. 1 is a partial, longitudinal, cross-sectional view of a turbojet engine housing having a known pivoting door type thrust reverser.
Figure 2:
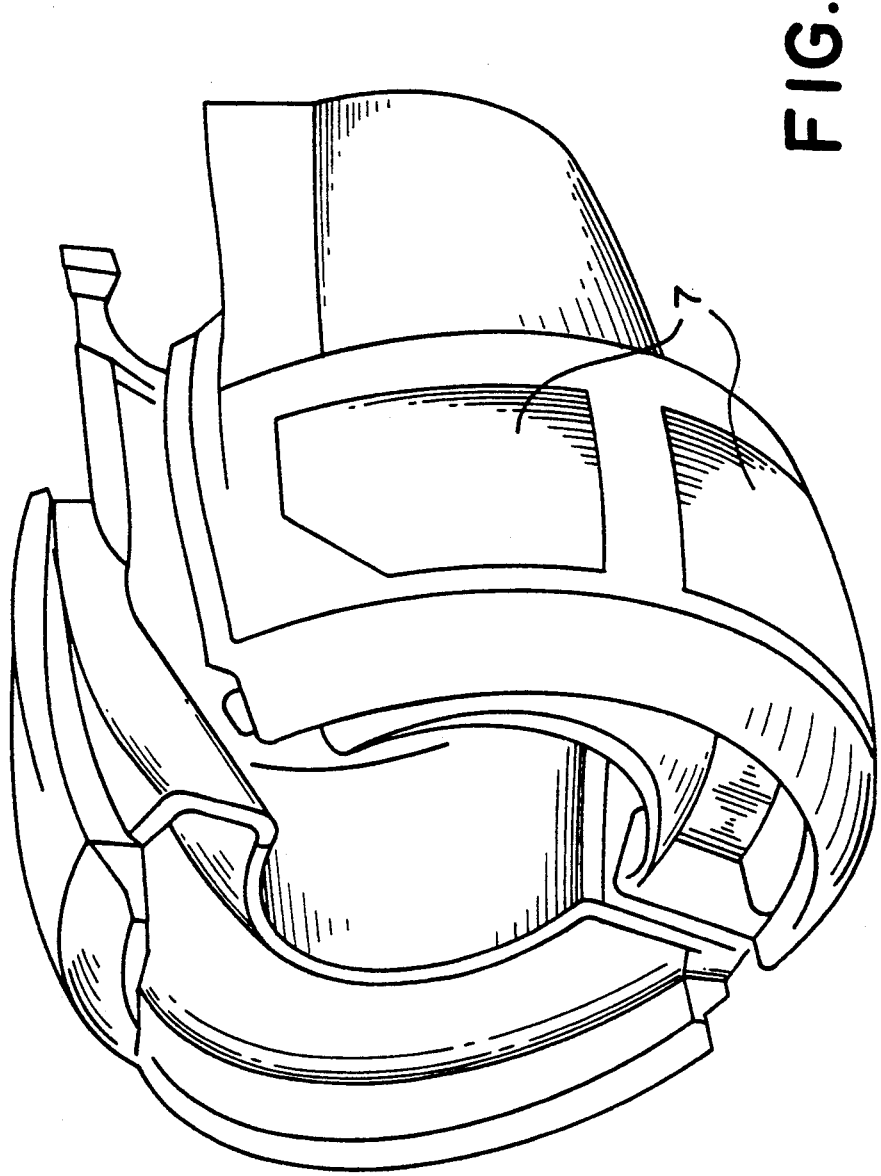
FIG. 2 is a perspective view of a turbojet engine housing incorporating the pivoting door type thrust reversers illustrated in FIG. 1.
Figure 5:
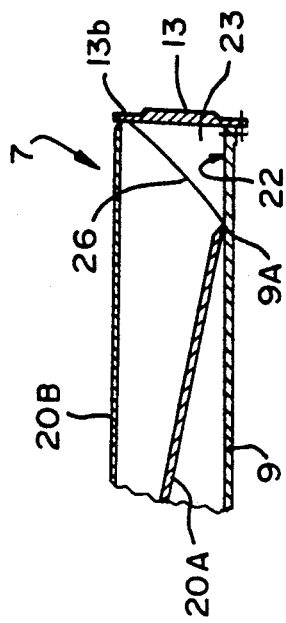
FIG. 5 is a partial, cross-sectional view taken along line V—V in FIG. 4.
Figure 4:
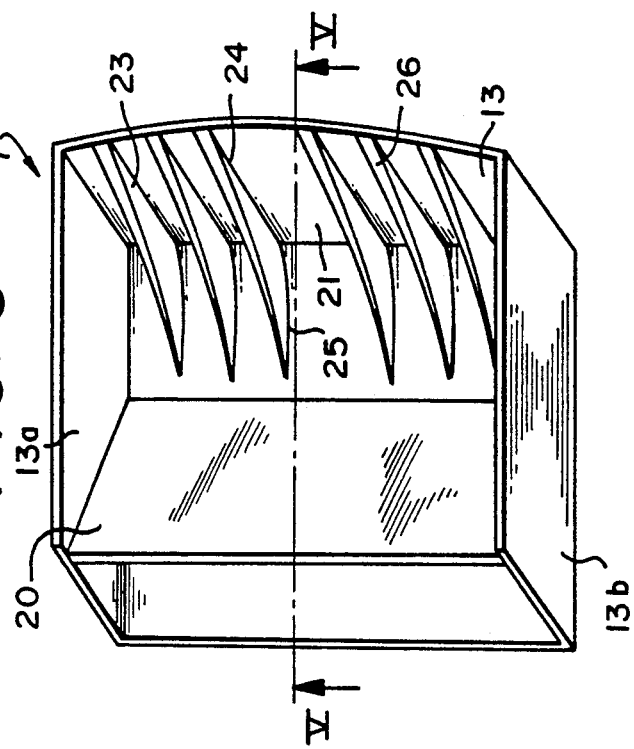
FIG. 4 is a partial, perspective view of a thrust reverser door according to the present invention.
Figure 3:
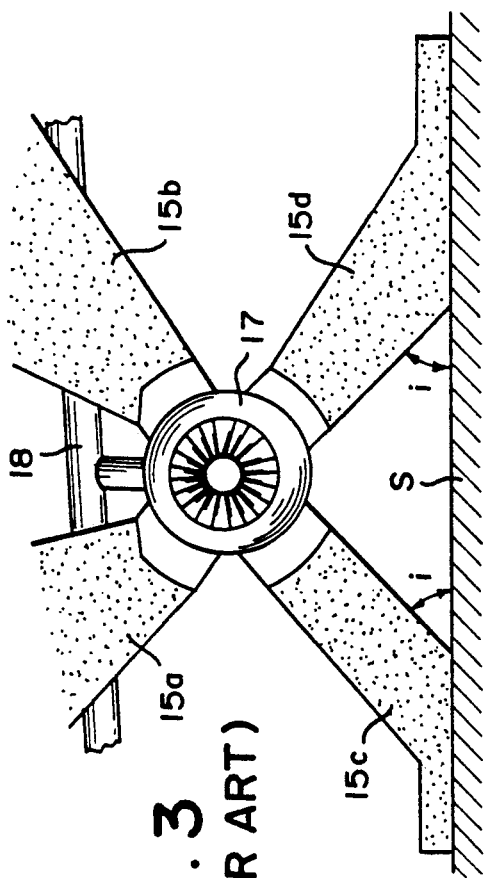
FIG. 3 is a partial, front elevational view of a wing mounted turbojet engine having a known type of thrust reverser.
Figure 6:
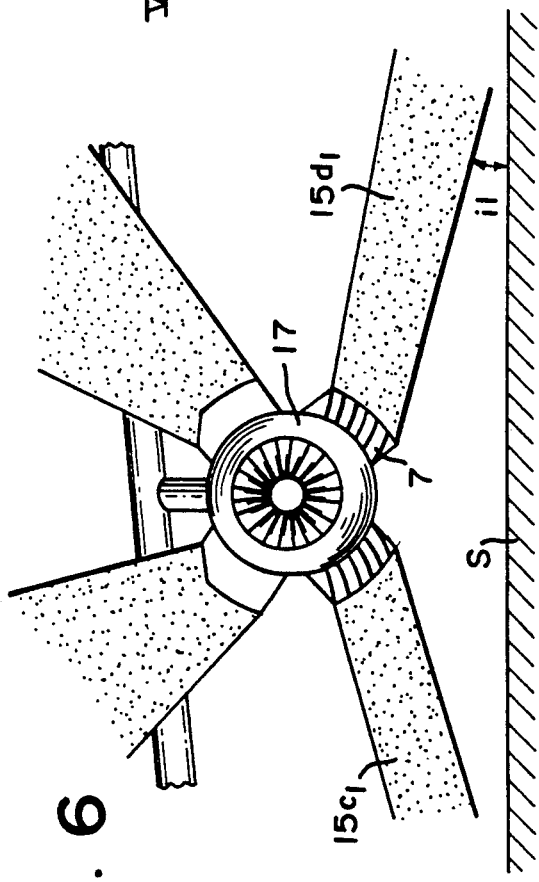
FIG. 6 is a front, elevational view, similar to FIG. 3, illustrating a wing mounted turbojet engine incorporating a thrust reverser according to the present invention.

FIG. 6 illustrates an operational embodiment of the present invention in which a turbojet engine 17, which is mounted under the wing of an aircraft, is equipped with a plurality (in this instance four) pivoting doors 7 which, in their opened positions, redirect at least a portion of the gases from the turbojet engine in a thrust reversing direction. FIGS. 4 and 5 illustrate a pivoting door of the thrust reverserincorporating the vanes according to the present invention. Portions of this door which are the same as the known prior art door, as illustrated in FIGS. 1 and 2, have been given the same identifying numerals. Thus, as can be seen, the door gas deflector 13 extends laterally across the upstream edge of the outer door panel 9 and performs functions identical with such a structure of the known prior art. The door gas deflector 13 may also be associated with side portions 13a and 13b which extend longitudinally along opposite sides of the thrust reverser door outer panel 9.

Inner door panel 20 is movable between positions 20A and 20B, as illustrated in FIG. 5. The inner door panel 20 may be movable by a known mechanism, such as that disclosed in U.S. Pat. No. 4,916,895. As is well known in the art, when the thrust reverser door 7 is in its closed, or forward thrust position, the inner door panel 20 assumes the position illustrated at 20B so as to eliminate cavity 16 and minimize disturbances in the gases passing through the gas flow duct. When the door 7 is moved to its opened, or reverse thrust position, the inner panel assumes the position illustrated at 20A (also illustrated in FIG. 4) so that the door gas deflector 13 may impart a forward direction to the reverse thrust gases.

In order to improve the directional control of the gases during the reverse thrust operation, the thrust reverser according to the present invention includes an array of vanes 23 which extend radially inwardly from an upstream edge portion of the thrust reverser door 7. The vanes 23 extend generally parallel to a longitudinal axis of the engine and may have a generally triangular configuration. Each vane may have one side 25 attached to and extending from an inner surface of the outer door panel 9 and a second side 24 attached to an inner surface 21 of the door gas deflector 13. The third side 26, as illustrated in FIG. 5, generally assumes the path of travel of the inner door panel 20 between vertex 9A and vertex 13B so as to avoid any interference with the inner door panel 20 during its movement. The array of vanes 23 extend laterally across the front edge portion of the thrust reverser door 7 substantially from one side to the other.

The contour of each vane 23 is determined in such a way as to insure improved performance during thrust reversal and to achieve the desired directional control of the thrust reversing gases. The vanes 23 constitute deflecting walls regularly arrayed across the width of the thrust reverser door 7 at its upstream edge portion.

Such directional control, as illustrated in FIG. 6, may prevent the reverse thrust gases from contacting a ground surface at an extreme angle of incidence as in the prior art devices. As can be seen, the lower thrust reversing doors 7 incorporate vanes 23 according to the present invention so as to direct the thrust reversing gas streams $15c_1$ and $15d_1$ in directions so as to reduce or minimize the angle of incidence i1 with the ground surface S, thereby avoiding the drawbacks of the prior art devices.

The thrust reverser according to the present invention may be operatively associated with a turbofan housing, in cases in which the turbofan-turbojet engine has a high bypass ratio. The structure is, however, equally applicable to hot gas flow ducts of a non-turbofan-type turbojet engine, or may serve to act on both the cold flow air and the hot gas flow ducts simultaneously.

Figure 7:
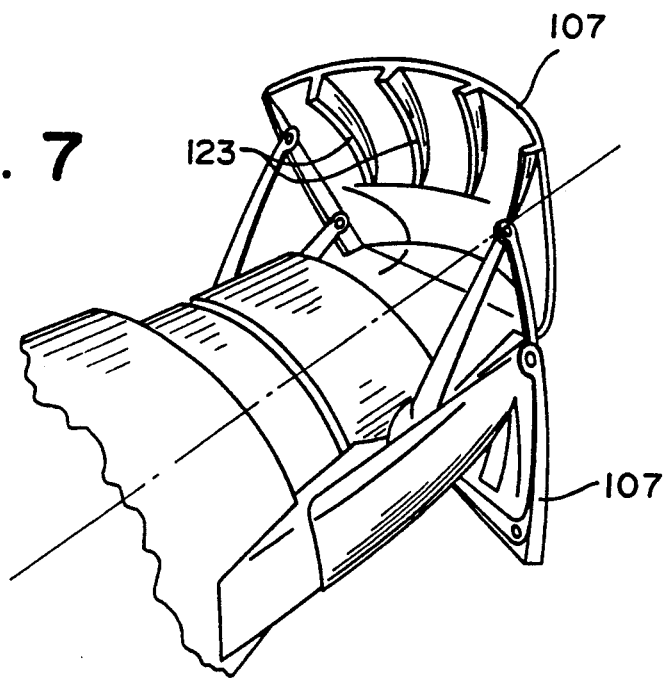
FIG. 7 is a partial, perspective view of the thrust reverser according to the present invention associated with the hot gas flow duct of a turbojet engine.

FIG. 7 illustrates a thrust reverser of the present invention applied to the rear portion of a turbojet engine and which acts upon the hot gases emanating from the hot gas flow duct. The thrust reverser doors 107 are, in known fashion, pivotally attached to the downstream portion of the duct and have vanes 123 to control the direction of the reverse thrust gases. The shapes and orientations of the vanes 23 and 123 may, of course, be oriented so as to achieve the control of the gases in the desired directions.

Figure 8:
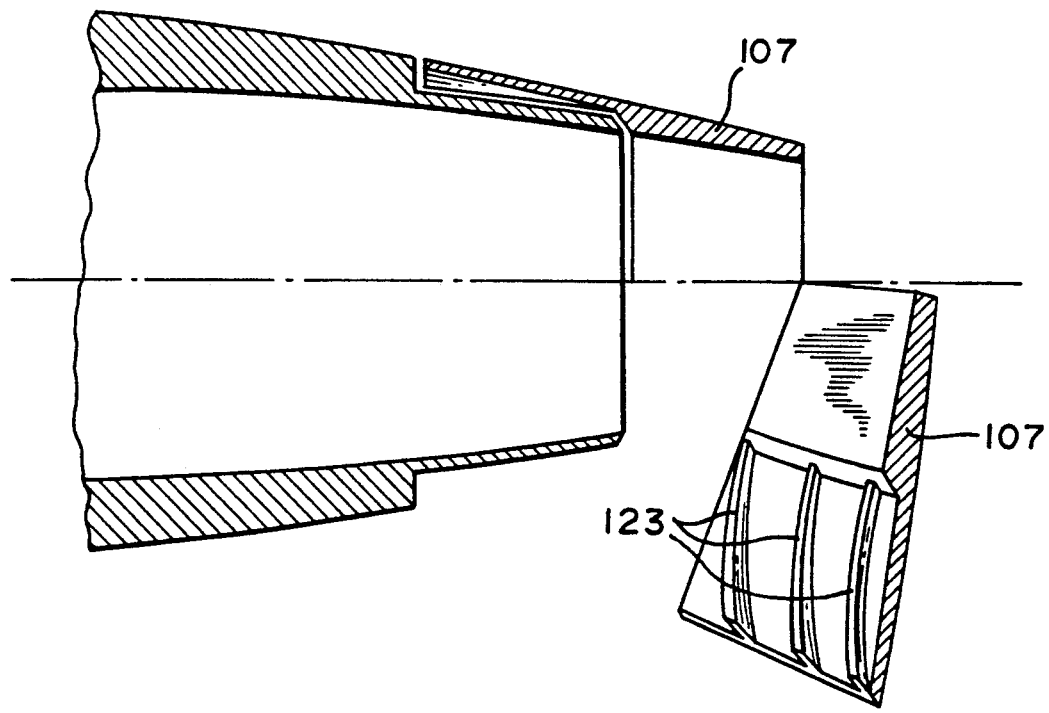
FIG. 8 is a schematic, cross-sectional view of the thrust reverser illustrated in FIG. 7 with the thrust reverser door in a closed position in an upper portion of the Figure and the thrust reverser door in a opened position in a lower part of the Figure.

The upper portion of FIG. 8 illustrates the thrust reverser doors 107 in their closed, forward thrust positions, wherein it can be seen that the vanes 123 occupy a space formed in the turbojet engine duct housing. The lower portion of FIG. 8 illustrates door 107 in its open, or reverse thrust position, which is also illustrated in FIG. 7.

The foregoing description is provided for illustrative purposes only and should not be construed as in any way limiting this invention, the scope of which is defined solely by the appended claims.

We claim:

1. A thrust reverser for a turbojet engine assembly, having a longitudinal axis, mounted on an aircraft, the turbojet engine assembly having a housing defining a gas flow duct adapted to allow gases to flow therethrough in an upstream to downstream direction, the thrust reverser comprising:
   a) a movable thrust reversing door having an upstream edge portion and opposite lateral sides, the thrust reversing door pivotally attached to the turbojet engine housing so as to be movable between a forward thrust position and a reverse thrust position wherein the movable thrust reversing door redirects at least a portion of the gases in the gas flow duct in a reverse thrust direction; wherein the thrust reversing door comprises:
      i) an outer panel defining the upstream edge portion; and
      ii) an inner panel having a front edge portion which is movable toward the outer panel as the thrust reversing door moves to its reverse thrust position;
   b) a gas flow deflector extending from the upstream edge portion of the thrust reversing door; and
   c) a plurality of spaced apart vanes arranged in an array extending between the opposite lateral sides of the thrust reversing door adjacent to the upstream edge portion of the thrust reversing door and extending generally parallel to the longitudinal axis so as to direct the reverse thrust gases in a desired direction, wherein the vanes each have a generally triangular configuration with a first side affixed to the thrust reverser door and a second side affixed to the gas flow detector.

2. The thrust reverser of claim 1 wherein the generally triangular vanes each have a first vertex located at an edge of the gas flow deflector and a second vertex located adjacent to a point of contact between the outer panel and the front edge portion of the inner panel.

3. The thrust reverser of claim 1 further comprising a turbofan housing operatively associated with the turbojet engine assembly so as to define a cold flow air duct wherein the thrust reversing door is operatively associated with the turbofan housing so as to redirect at least a portion of the gases passing through the cold flow air duct in a reverse thrust direction.

* * * * *

UNITED STATES PATENT AND TRADEMARK OFFICE
CERTIFICATE OF CORRECTION

PATENT NO. : 5,284,015

DATED : Feb. 8, 1994

INVENTOR(S) : Carimali et al.

It is certified that error appears in the above-identified patent and that said Letters Patent is hereby corrected as shown below:

Column 1, line 13, change "radically" to --radially--.

Signed and Sealed this

Twenty-eighth Day of June, 1994

Attest:

BRUCE LEHMAN

Attesting Officer

Commissioner of Patents and Trademarks